United States Patent [19]
Plotkin et al.

[11] Patent Number: 5,787,433
[45] Date of Patent: Jul. 28, 1998

[54] METHOD AND SYSTEM FOR REMAPPING AN EXISTING DATABASE TO A NEW DATABASE SYSTEM

[75] Inventors: Robert Charles Plotkin, Irvington; Michael Stephen Schwartz, Bronx, both of N.Y.

[73] Assignee: International Business Machines Corporation, Armonk, N.Y.

[21] Appl. No.: 818,407

[22] Filed: Mar. 17, 1997

[51] Int. Cl.[6] .................................................. G06F 17/30
[52] U.S. Cl. ................................. 707/101; 707/2; 707/200
[58] Field of Search ............................ 707/2, 101, 102, 707/200, 203

[56] References Cited

U.S. PATENT DOCUMENTS

| | | | |
|---|---|---|---|
| 4,631,664 | 12/1986 | Bachman | 707/100 |
| 4,894,771 | 1/1990 | Kunii et al. | 707/4 |
| 5,315,709 | 5/1994 | Alston, Jr. et al. | 707/6 |
| 5,467,471 | 11/1995 | Bader | 707/1 |
| 5,710,917 | 1/1998 | Musa et al. | 395/681 |

OTHER PUBLICATIONS

Youn et al., "Date Migration", IEEE pp. 1255–1258, Aug. 1992.

ImagePlus VisualInfo, Application Programming Reference, vol. 2, Version 2, Release 1,SC31–9061–00, Chapter 1. Common Application Programming Interfaces, pp. 36–41, no date.

IBM Database 2, Command Reference—for common servers, Version 2, CLP Commands, pp. 82–86 & 162–172, no date.

The Systems Programming Series, vol. I, An Introduction to Database Systems, 4th Edition, C. J. Date, 6, Data Manipulation pp. 127–153, no date.

IBM Dictionary of Computing, Information Processing, Personal Computing, Telecommunications, Office Systems, IBM-specific Terms, Data Access Arangement (DAA) pp. 104, 358 & 234, no date.

*Primary Examiner*—Thomas G. Black
*Assistant Examiner*—John C. Loomis
*Attorney, Agent, or Firm*—Louis J. Percello

[57] ABSTRACT

When migrating legacy database systems to a new database system the relationships between tables need to be preserved. Also, base tables and their children have to maintain their relationship. A database system which creates a system generated unique key is stored with the data which is loaded. To enable load, search, and retrieval to be efficient a data remapping function is defined which uses the system generated key to maintain the relationships which were maintained by a unique key in the legacy systems.

8 Claims, 6 Drawing Sheets

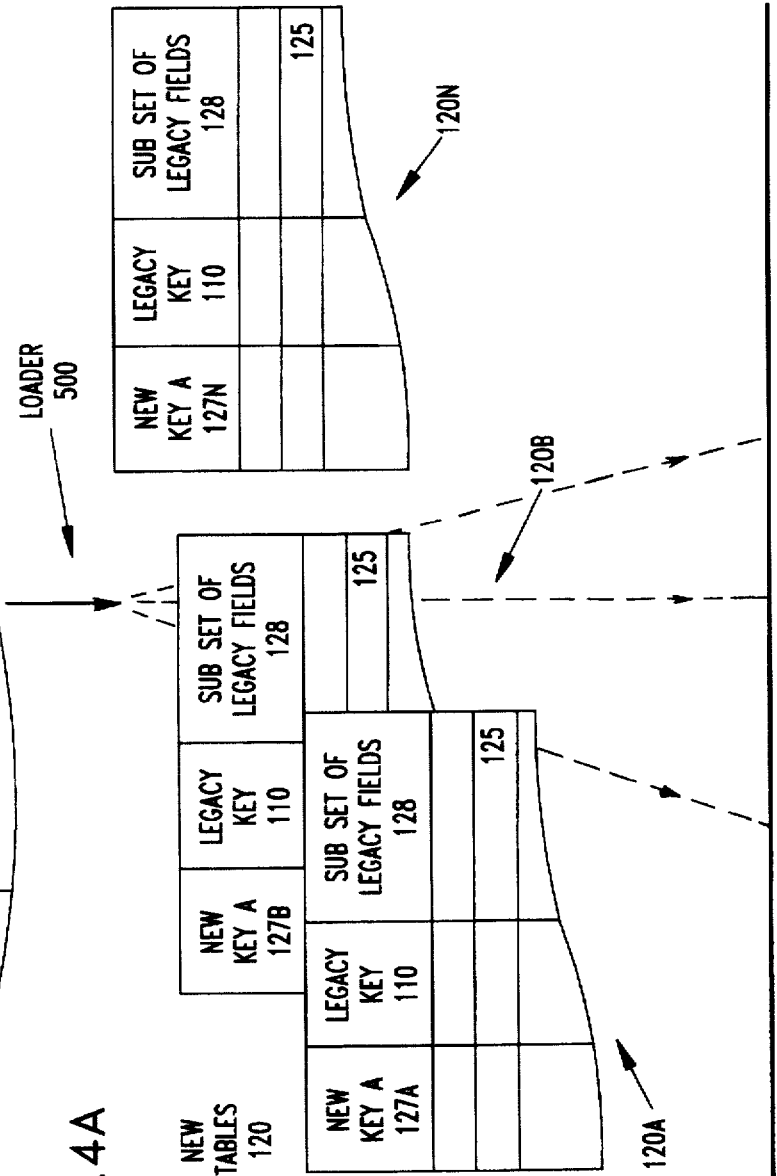

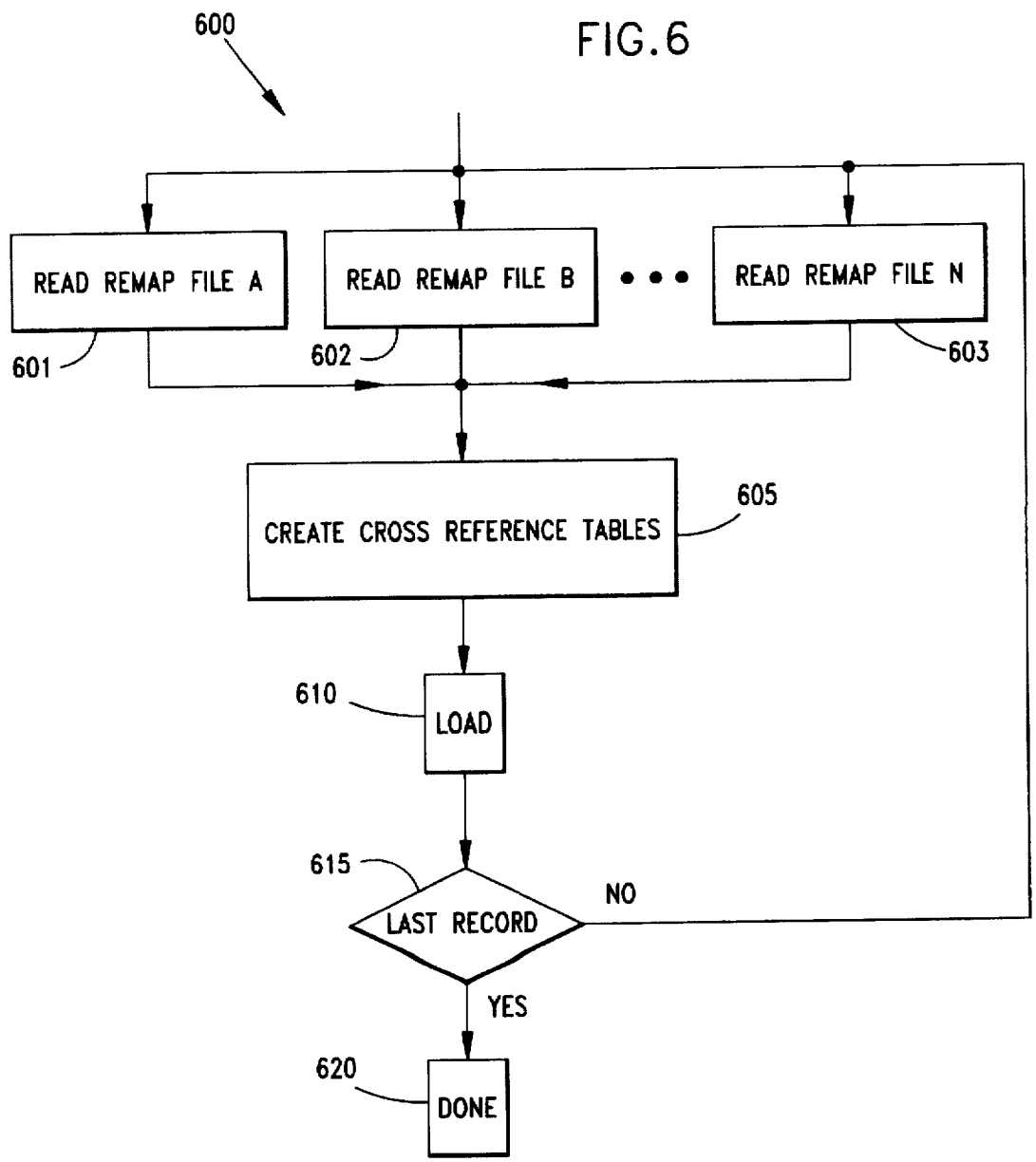

METHOD AND SYSTEM FOR REMAPPING AN EXISTING DATABASE TO A NEW DATABASE SYSTEM

FIELD OF THE INVENTION

This invention relates to the field of database systems. More specifically, the invention relates to remapping data from legacy systems.

DEFINITIONS

A legacy system is an existing database system.

A data base is a set of data, part or the whole of another set of data, that consists of at least one file, and that is sufficient for a given purpose or for a given data processing system.

A relational data base is organized and accessed according to relationships between data items.

A base table is the main or parent table. Tables related to a base table are its children.

See "Dictionary of Computing" by the IBM Corporation; "An Introduction to Database Systems" (Fourth Edition), Chapter 6, by C. J. Date; "IBM Database 2 Command Reference" by IBM Corporation; and "Application Programming Reference", Volume 2 by IBM Corporation. These references are herein incorporated by reference in their entirety.

BACKGROUND OF THE INVENTION

The prior art can export tables from a database system and then load them into a new database system. Several of the tables can be related to one another and these relationships need to be preserved. When loading into a new database system each row of data is assigned a system generated unique key. Present asset management systems identified each row of data with a unique key and this key is used to relate tables in their system. Cross reference tables are normally generated after the tables are loaded for the purpose of improving search and retrieval based off of the system generated keys.

FIG. 1 depicts how data 100 is exported and then loaded into a new database system 120. It also shows a cross reference table 150. This diagram shows that the Legacy Data 100 has a Legacy Key 110 with Legacy Fields 115 for each record 105 in the legacy database 100. The Legacy Key 110 is a unique key for each Legacy record 105. The Tables 120 are loaded from the Legacy Data 100 into a database system 120 which generates a New Key (127A thru 127N) for each table (120A-120N) which contains a subset of Legacy Fields 128. The Cross Reference Table 150 is generated from these Tables 120 by taking the New Key (127A-127N) from each Table (120A-120N) and optionally the respective Legacy Key 110 with all the New Keys (127A thru 127N) which share the respective Legacy Key 110.

FIG. 2 illustrates how the cross reference tables 150 are built via exhaustive searches of the loaded tables (120A-120N) with the prior art. The process 200 is a flow chart of the process steps of generating a cross reference table 150 using the prior art.

Step 203 deals with loading the data tables (120A-120N) using standard database system load techniques.

Step 205 is the beginning of a loop which performs a search of the new tables (120A-120N) for the original (legacy) key (110) in each table (120A-120N) and collects this information for building the Cross Reference table 150.

Step 210 determines whether the last table has been processed. If not, the process 200 returns to Step 205—otherwise Step 215 is executed and an entry 155 is created in the Cross Reference table 150 for the original key 110.

STATEMENT OF PROBLEMS WITH THE PRIOR ART

Prior art fails to provide a way of relating the tables (120A-120N) which are related when loading those tables into a new database system 120 such that search and retrieval will be efficient.

1) To build a cross reference 150 which relates the tables an exhaustive search of the loaded tables is required. This is slow.

Take, for example, loading an exported table which has task and description columns into a new database system where the task is the unique key. Upon load the new database system fills in an additional column in the table with the system generated unique key (127A-127N). Now another table which has task and name columns is loaded into the new database system. The second table is related to the first table by the task column. One needs to be able to say how these tables are related. This relationship is identified by building the cross reference table 150 based upon many searches through the new database system. This is very costly. For instance, suppose the first table has 1,000,000 rows and the second table has 5,000,000 rows. To build the cross reference which shows how these tables are related can take as long as 24 hours. This is due to the types of join operations which are involved.

2) To implement the needed searches. (This is difficult due to a combinatorial explosion problem.)

There is a possibility of not capturing all the relationships due to the combinatorial explosion problem. For instance, for a large number of tables, join operations do not work because of limitations on the number of tables that can be processed by join operations in the prior art.

For example, if you have 3 tables which are related from an existing database system 100 that have been migrated into a new database system 120, preserving these relationships requires construction of a cross reference table 150 based upon the system generated unique key (127A-127N) from the new database system 120. For each entry 155 in the cross reference table 150 a "select" is performed that establishes a relationship between two or more tables (120A-120N). In this three table example, there are 7 possible select conditions. There are: 1. all three tables can share a value (one select condition), 2. any two of the three tables can share a value (three select conditions), and 3. any two of the three tables does not share a value (three "deselect" select conditions). Expanding this example to the general case, there are (2 exp n) −1 select conditions (where n is the number of tables, (127A-127N)) to create the cross reference table 150. Therefore, the prior art requires an exponential increase in the number of selects, with respect to the number of new tables (127A-127N), in order to create the cross reference table 150. The prior art is therefore limited in the number of new tables that it can cross reference.

OBJECTS OF THE INVENTION

An object of the invention is an improved system method of database remapping by removing search/select requirements.

An object of the invention is to create remapping files during the creation of new tables in a relational database.

SUMMARY OF THE INVENTION

The invention deals with creating data remapping files while loading tables into a new database system. "Remapping" maps a legacy/original key from the legacy system to the system generated key from the new database system for all the tables related to a base table through the legacy/original key. (Note that in this disclosure original key and legacy key are used as interchangeable terms.)

The data remapping files contain the original key which is part of the base table, the system generated key and other fields which were specified on a load statement to be included. The data remapping file is created while the new (base) tables are loaded with data. In this way, no later search/select operation is required.

In a preferred embodiment, the data remapping file(s) is (are) self describing in that it contains the name of the fields which are written into it with their offsets and lengths. If the table is not sorted by the original key before loading, the data remap file will have to be sorted by the original key and not the system generated key. This is so the cross references can be built without any searches.

BRIEF DESCRIPTION OF THE DRAWINGS

The foregoing and other objects, aspects and advantages will be better understood from the following detailed description of preferred embodiments of the invention with reference to the drawings that are included in the following:

FIG. 6 is a flow chart of a novel cross reference table generating (remapping) process showing the steps of creating a cross reference table(s) from the remap file(s).

DETAILED DESCRIPTION OF THE INVENTION

Figure 1:
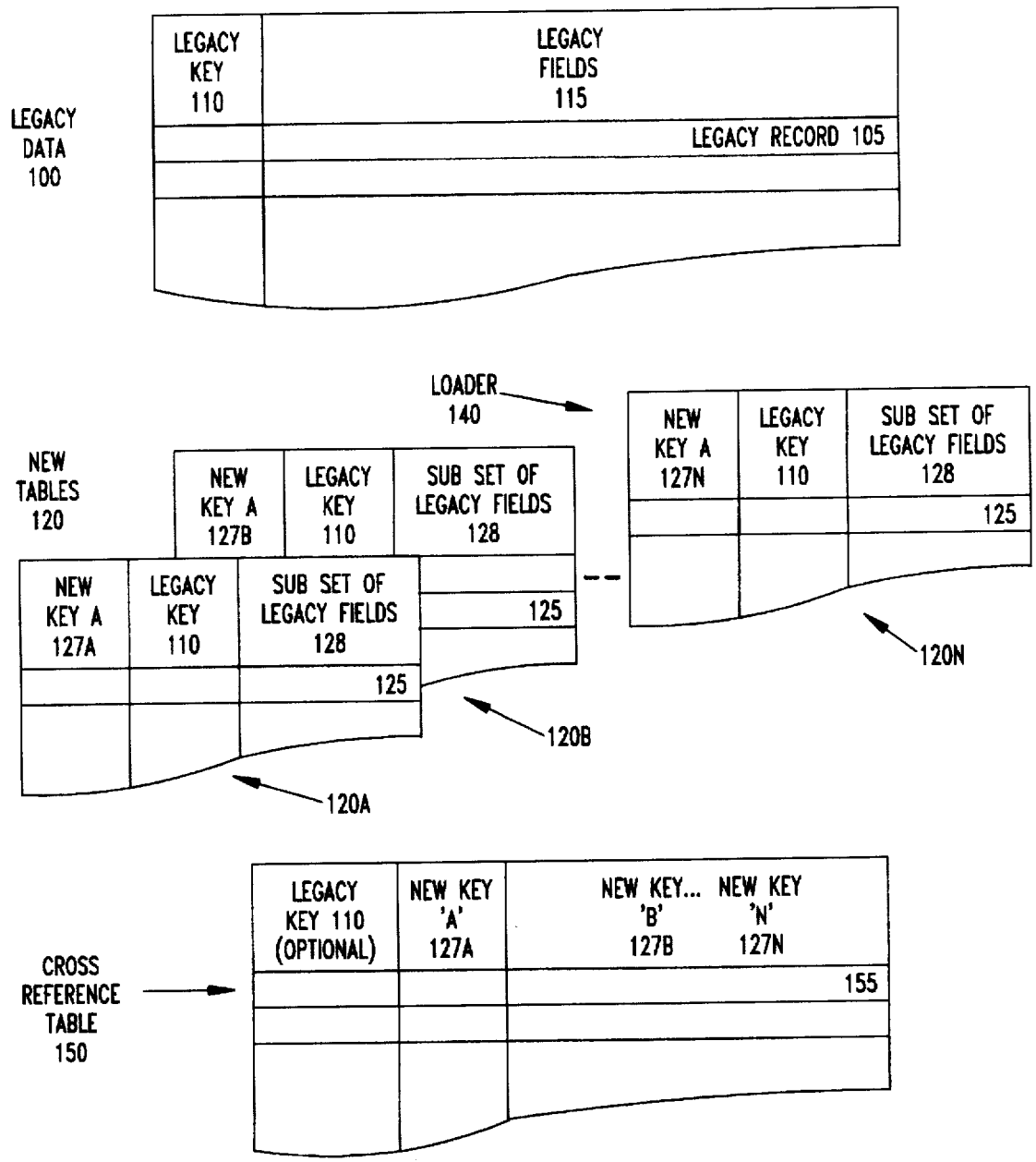
FIG. 1 is a block diagram of the prior art depicting how data is exported and then loaded into a new database system with a cross reference table.
Figure 2:
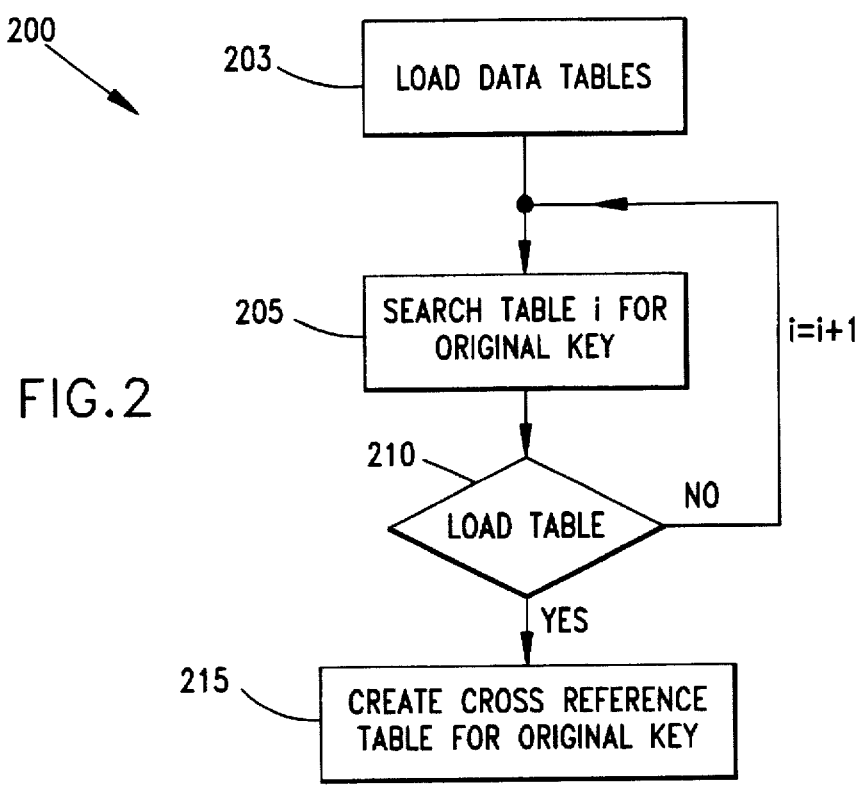
FIG. 2 is a flow chart of the prior art steps of building the cross reference tables via exhaustive searches of the loaded tables.
Figure 3:
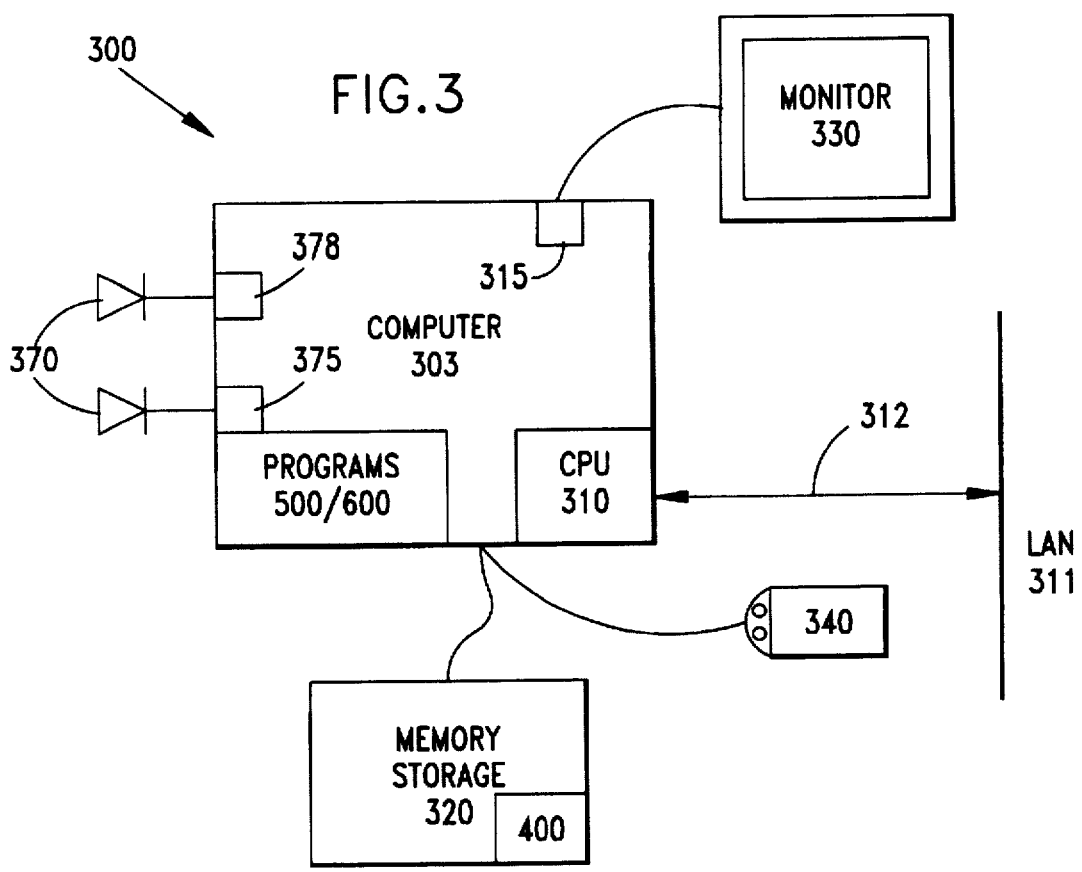
FIG. 3 displays a computer system on which the data remapping function runs.

FIG. 3 displays a computer system on which the data remapping processes (500, 600) run. The present invention is capable of running on any general purpose computer system 300, including units which have the ability to present multimedia information. The computer system 300 comprises a control processing unit (CPU) 310, memory storage device 320, one or more monitors or graphical interfaces 330, and selection device 340 such as a mouse or speech recognition system 378. In one embodiment, a IBM RISC SYSTEM/6000 300 comprises a control processing unit (CPU) 310, memory storage device 320 (on which data structures 400 reside), one or more monitors 330, and a mouse 340. On an IBM RISC System/6000 multiple monitors 330 can be controlled by multiple monitor adaptor cards 315 such as the IBM RISC System/6000 Color Graphics Display Adaptor. The computer system 300 may also have audio input/output capability 370. An ActionMedia II Display Adapter 375 (described in the IBM ActionMedia II Technical Reference) can be used for audio/video playback 370. This adaptor 375 may also be used to display full motion video and sound audio/visual on the monitors 330. In addition, speech recognition 378 may be provided (such as the IBM VoiceType Dictation Adapter).

In one preferred alternative embodiment, the CPU 310 can be connected to 312 a client/server network (or LAN 311) to which other target monitors 330 and/or systems 300 are connected.

Figure 4B:
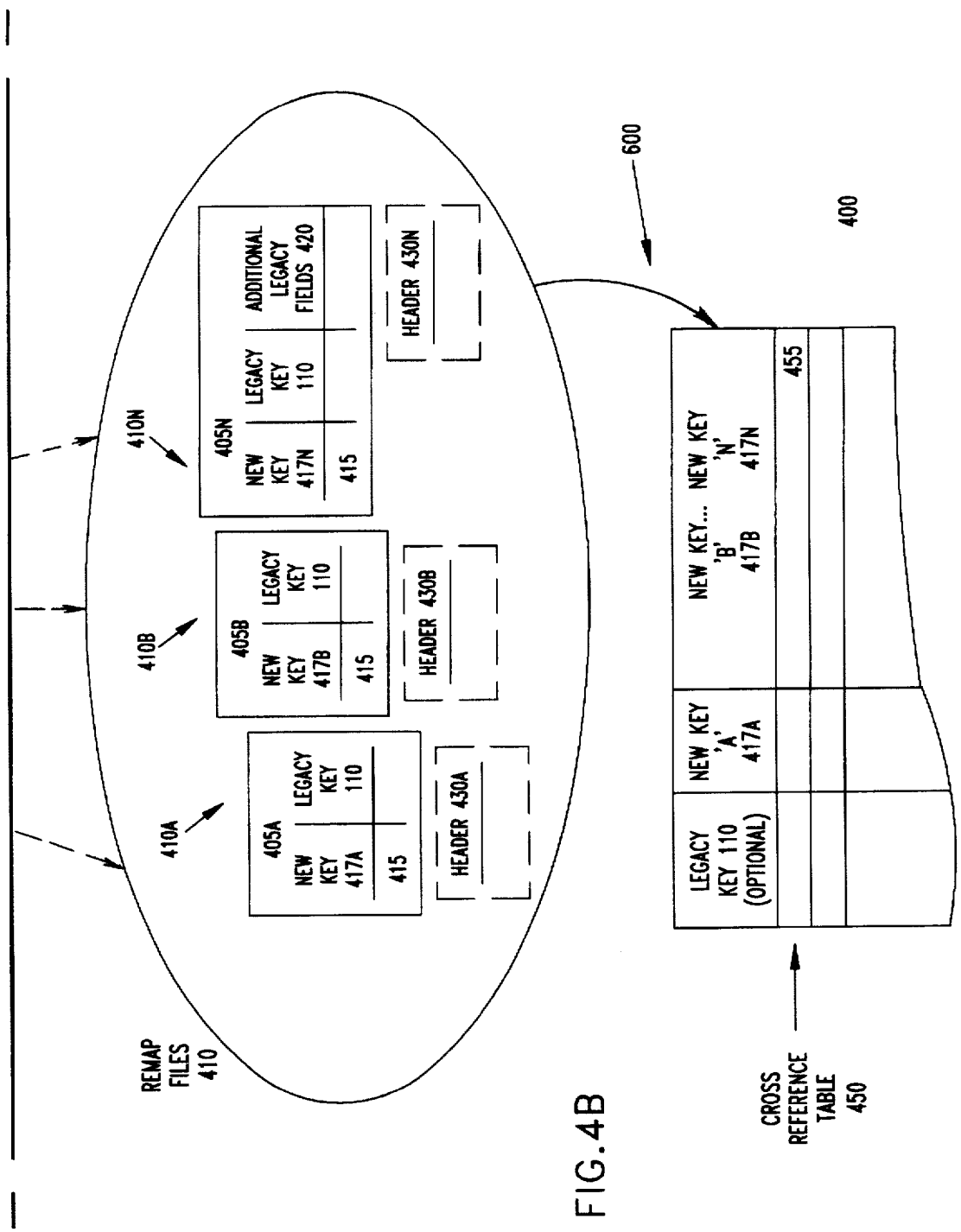
FIG. 4 is a block diagram of the present invention showing a novel data structures and novel loading and remapping processes.

FIG. 4 is a block diagram of the present invention showing novel data loading 500 and remapping 600 processes and related data structures 410.

The system 400 includes a legacy database 100 that has a plurality of legacy records (typically 105) each uniquely identified by a legacy key 110 and further having one or more legacy fields 115. A novel table loader 500 (see further description in FIG. 5 below) loads a plurality of tables 120 (e.g. 120A–120N) that are used in a new relational database (120 and 450). The tables 120 each have one or more records (typically 125) that in turn each have the legacy key 110, a new key (127A–127N), and a subset of legacy fields (128, e.g. 128A–128N in each respective table 120A–120N). The structure of the legacy database 100 and the tables 120 is well known as described above.

The present invention adds two or more novel remap files 410. Each of the remap files 410 has one or more remap records 415 each of which has at a minimum the legacy key 110 that comes from the legacy data 100 which is being remapped 600 and a new key (417A thru 417N) which is system 400 generated. The remap files 410 are loaded with information by the novel table loader 500 as described below (see FIG. 5 description below). Further a novel cross reference generator (remapping process) 600 (see FIG. 6 description below) generates the cross reference table 450 which has cross reference records 455 consisting of the legacy key 110 and the new key 417A thru 417N for each remap file (410A–410N) associated with the legacy key. The legacy key may be on more than one row of the cross reference table since it is possible for more than one combination of new keys (417A–417N) to share the same legacy key 110. An example of this would be having a project with several subcomponents in it. The subcomponents when combined can reference the same legacy key 110 but more than one record 415 is produced in the cross reference table 450.

The data remapping function 600 generates cross references in a matter of a few minutes for millions of records versus at least a day with prior art. This saves computing time and allows for very large number of cross references 455. In addition to this, the invention is able to remap 600 the remap files 410 rather than the every new table 120 in order to determine relationships between two or more of the new tables 120. This remapping 600 searches only the records 415 of the remap files 410 and therefore the time to do the remapping is only linearly dependent on the number of remap files 410. This is a vast improvement of the exponential search/selection processes in the prior art.

In addition, the invention permits very large number of relationships to be cross referenced because there is no limitation due to join operations.

In a preferred embodiment, the remap files 410 are sorted by the legacy key 110. This sort is done prior to generating the cross reference table 450 so that relationships between two or more of the remap file records 415 can be determined in one pass through each of the remap files 410. The sort can be done when unloading the legacy data (prior to creating the legacy data 100) or after the remap files 410 are built by the table loader 500.

In one preferred embodiment, additional information 420 (420A–420N, respectively) can be added to the remap files 410 when the system generates the new key. This information 420 can include user specified information 420. For example, in the loading process 500, the user defines which additional fields 420 should be included in the remap files 410. The loader 500 then loads this additional information 420 into the remap files 410 along with the new keys 417. Examples of this additional information 420 include: descriptions of objects and/or dates objects where created. From this information, prior art techniques can be used to build an inventory of the objects in the database.

In an alternative embodiment, headers 430 (430A–430N, respectively) are attached to each of the remap files 410 to provide descriptive information used to determine which fields (110, 417, 420) of the remap files 410 are to be matched to determine relationships in the cross reference table 450. This enhancement enables one to have an SQL like language which can perform matches on the records 415 and one can specify field names (110, 417, 420) which should be related between the remap files.

Figure 5:
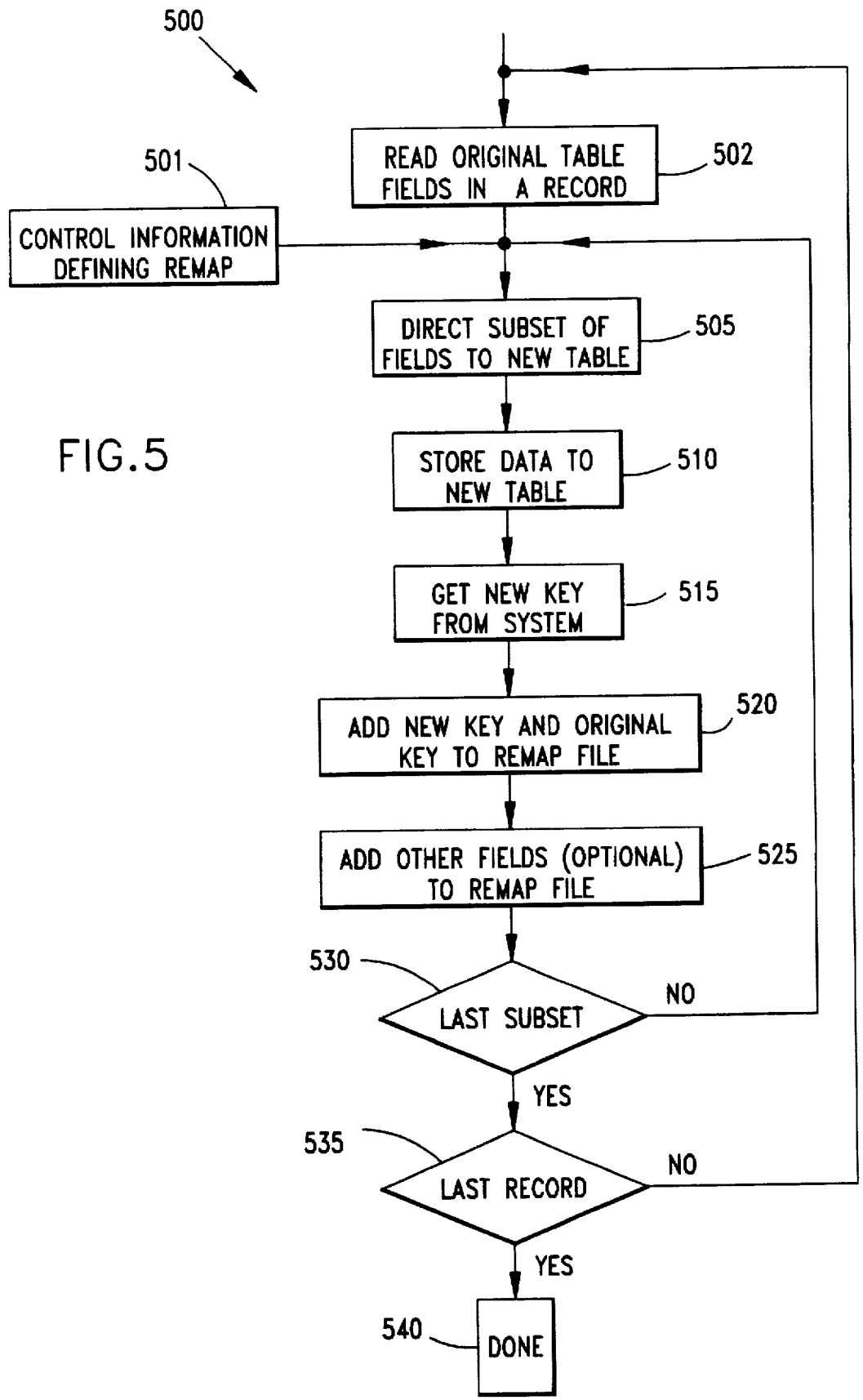
FIG. 5 is a flow chart of a novel table loading process.

FIG. 5 is a flow chart of the process steps 500 that embody the table loader.

Step 502 reads a record 105 containing the original table 100 fields. The original table fields (110, 115) come from the legacy data. The legacy data 100 can either be in a database or files. One could unload the legacy data to files before using the table loader. Unload of data is well known in the prior art.

Step 501 contains novel control information defining what fields (110, 115) are to be remapped to what remap file 410 and which fields (110, 115) are to be loaded into which table 120. A user inputs the information (using known techniques) saying which fields (110, 115) from the legacy data 100 goes into which table 120 and whether the field (110, 115) is placed in a remap file 410 and further in which remap file 410 the legacy field 110 is placed.

Step 505 uses the control information to direct a subset of fields to the new table(s) 120 in FIG. 4 from the legacy data 100. This is well known in the prior art.

Step 510 stores the data into the new table(s) 120. The Legacy Data 100 selected by the control information is placed in the new table(s) 120. The way of inserting data into a table is well known in the prior art. See References 1 and 2 above.

Step 515 obtains the new key (system generated unique key) from the database system.

Step 520 novelly adds the new key and original key to the remap file 410 which is used to build the cross reference table(s) 450. This part is novel since we build this file while loading the new tables 120. This mechanism allows us to build cross references rapidly and thereby enables one to find all the related information associated with a project by only using the cross reference. No expensive and time limiting re-searching of the new tables 120 is required to generate to cross reference table 450.

Step 525 adds other fields 420 (optional) to the remap file if they were specified in the control information for said remap file. For example, a use for this would be to build an inventory of objects.

In one preferred embodiment, the information (417, 110, 420(optionally)) is added to the remap files in a sorted order. This sort is on the legacy key 110 and can be ascending or descending order. Preferably, the sorting order is the same in each remap file 410. This can be accomplished by first sorting the legacy data 100 by the legacy key 110. Alternatively, the legacy data 100 is unloaded in the sorted order. These sorting techniques are well known.

In an alternative preferred embodiment, each remap file 410 is sorted by the legacy key 110 once the respective remap file 410 has been created.

Step 530 asks whether this is the last subset (i.e. the last record 415 of all of the remap file 410) has been processed. If not, the loader process 500 returns to Step 505 and creates another record in a remap file which was specified in the control information. Otherwise, Step 535 asks if this is the last record for the legacy data table 100. If not, the loading process 500 returns to Step 502 and reads in another record from the legacy data 100 and uses the control information 501 again to build the remap files 410. Otherwise, one goes to Step 540 and one has built the remap files 410.

Using this loading process 500, one record 125 is created in at least one new table 120 for each record 105 in the legacy data 100. In addition, for each record 125 created in each new table 120 there is a corresponding record 415 created in one or more remap file(s) 410. The remap files all have the legacy key field 110 which is used (600 below) to cross reference the legacy data in the new tables 120.

FIG. 6 is a flow chart of the process steps 600 that embody the cross reference generator that builds the cross reference table 450 by accessing the remap files 410. Specifically, the cross reference table 450 correlates every new key 415 that is in a record 125 of the new tables 120 that contains a given subset of legacy fields 128 associated with a given legacy key 110, with that respective legacy key 110.

Steps 601 through 603 show a set of remap files 410 being read. Preferably these remap files 410 are read in parallel, i.e., any given record of any given remap file 410 is read at the same time. As stated above, It is assumed the remap files are sorted by the Legacy Key.

Step 605 creates a cross reference record which contains the new key 417A thru 417N from each remap file 410 which has the same legacy key 110. That is, every new key 417 that is correlated in a record 415 with a given legacy key 110 is associated in a single record 455 in the cross reference table 450.

At this point, since the remap files 410 are sorted by legacy key 110, a sequential traverse of the remap files is all that needs to be done, i.e. the legacy keys 110 are traversed in a linear fashion. This process does not require multiple pass searching through any of the tables.

Step 610 loads the created record 455 (associated with the give legacy key 110) into the cross reference table 450. The loading technique is well known in the prior art. Note that using database techniques the cross reference table 450 can be distributed.

Step 615 determines whether all the records 415 in everyone of the remap files 410 have been processed. If not, the data remap process 600 returns to steps 601–603. If all the records 415 are processed, the process 600 ends 620.

Here are some examples of how this invention can be used. Any archiving or library system (film, video, etc.), i.e., legacy data 100, which is migrated would benefit from this the data remapping function. All archiving systems have unique keys and relationships between tables. Here the new tables 120 might enable accessing the legacy data 100 with new queries. Further, the legacy data 100 can be augmented and/or annotated in new way and/or new relationships can be defined among the legacy records 105. Using this invention, large numbers of legacy records 105 can be migrated into new tables 120 and crossed referenced quickly.

For instance, a legacy database 100 has one million records with information about video tapes. Each record 105 contains 10 fields with information about a given tape and inventory. It is necessary to create 3 new tables 120 that contain inventory information, intratape information (e.g. film clips), and general data (e.g. target markets), respectively. Rather than performing $(1,000,000)3$ searches to generate the necessary cross reference table 450**, this invention allows for one sequential traverse of just 1,000,000 records in the created remap files.

Given this disclosure alternative equivalent embodiments will become apparent to those skilled in the art. These embodiments are also within the contemplation of the inventors.

We claim:

1. A method for cross referencing a legacy database, comprising the steps of:

reading, from the legacy database, a plurality of legacy records associated with a legacy key, the legacy records having one or more legacy fields;

creating two or more new tables, each of the new tables having a plurality of new records with one or more new fields, each of the new records being a subset of the legacy fields and having a new key and the respective legacy key of the subset of legacy fields;

for each new record created in the new tables, creating a corresponding remap record in one or more remap files, each remap record having all of the new keys for each new record associated with one of the respective keys; and building a cross reference table that correlates every new key in every new record that contains a subset of legacy fields for the respective legacy key.

2. A method for cross referencing a legacy database, comprising the steps of:

means for reading, from the legacy database, a plurality of legacy records associated with a legacy key, the legacy records having one or more legacy fields;

means for creating two or more new tables, each of the new tables having a plurality of new records with one or more new fields, each of the new records being a subset of the legacy fields and having a new key and the respective legacy key of the subset of legacy fields;

means for creating, for each new record created in the new tables, a corresponding remap record in one or more remap files, each remap record having all of the new keys for each new record associated with one of the respective legacy keys; and means for building a cross reference table that correlates every new key in every new record that contains a subset of legacy fields for the respective legacy key.

3. A computer system of one or more computers comprising:

a legacy database, the legacy database having a plurality of legacy records, each of the legacy records having two or more legacy fields, one or more of the legacy fields used as a unique legacy key, the legacy key identifying the respective legacy record;

two or more tables, each table having a plurality of table records, each table record having one or more of the legacy fields taken from one of the legacy records, and each table record further having a the legacy key identifying the respective legacy record and a unique new key identifying the respective table record;

two or more remap files, each of the remap files uniquely corresponding to one of the tables, and each of the remap files having a remap record uniquely corresponding to one of the table records in the corresponding table, each of the remap records having the legacy key and the new key of the corresponding table record;

one or more cross reference table having a cross reference record uniquely corresponding to one of the legacy keys, each of the cross reference records further having every new key with the respective legacy key in one of the remap records;

a table loader for loading one or more of the legacy fields and the legacy key from one of the legacy records into the respective table record and assigning the respective new key to the table record, the table loader further writing the legacy key and the new key as the remap record of the remap field of the corresponding table record; and a cross reference table generator that read all the remap files and loads one or more of the cross reference records in the cross reference table for each of the legacy keys.

4. A system, as in claim 3, where the table loader loads one or more of the legacy fields from a legacy database.

5. A system, as in claim 3, where the table loader loads one or more of the legacy fields from an intermediate file.

6. A system, as in claim 3, where all the remap files are in an order sorted by legacy key.

7. A system, as in claim 6, where the table loader produces the remap files in the sorted order.

8. A system, as in claim 6, where the remap files are sorted by a sorter after the table loader writes the remap file.

* * * * *